(12) United States Patent
Imamura

(10) Patent No.: US 10,691,075 B2
(45) Date of Patent: *Jun. 23, 2020

(54) TIMEPIECE, METHOD OF DISPLAY CONTROL, AND STORAGE MEDIUM

(71) Applicant: CASIO COMPUTER CO., LTD., Tokyo (JP)

(72) Inventor: Keiichi Imamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 244 days.

This patent is subject to a terminal disclaimer.

(21) Appl. No.: 15/856,071

(22) Filed: Dec. 28, 2017

(65) Prior Publication Data

US 2018/0181081 A1    Jun. 28, 2018

(30) Foreign Application Priority Data

Dec. 28, 2016   (JP) .................................. 2016-256631
Oct. 2, 2017    (JP) .................................. 2017-193062

(51) Int. Cl.
*G04G 9/00*     (2006.01)
*G04G 99/00*    (2010.01)
(Continued)

(52) U.S. Cl.
CPC .............. *G04G 9/0064* (2013.01); *G04G 9/02* (2013.01); *G04G 9/045* (2013.01); *G04G 21/00* (2013.01);
(Continued)

(58) Field of Classification Search
CPC ........ G04G 9/0064; G04G 9/007; G04G 9/02; G04G 9/045; G04G 21/00; G04G 99/006; G04B 19/22; G04B 19/23
See application file for complete search history.

(56) References Cited

U.S. PATENT DOCUMENTS 10,126,714 B2 *  11/2018  Misaki ................. G04G 9/0076
2004/0027396 A1 *  2/2004  Lection ............... G06F 3/04847
                                                        715/863
(Continued)

FOREIGN PATENT DOCUMENTS

CN    102445212 A    5/2012
CN    102902195 A    1/2013
(Continued)

OTHER PUBLICATIONS

U.S. Appl. No. 15/794,749, filed Oct. 26, 2017.
(Continued)

*Primary Examiner* — Edwin A. Leon
*Assistant Examiner* — Jason M Collins
(74) *Attorney, Agent, or Firm* — Chen Yoshimura LLP

(57) ABSTRACT

A timepiece includes one or more processors; and a display unit controlled by the one or more processors. The one or more processors perform: obtaining a clock hand image; obtaining positional information indicating a location of the timepiece; and controlling the display unit to display a map image that includes the location of the timepiece and to display the clock hand image superimposed onto the map image in such a rotated manner as to indicate a time, a center of rotation of the clock hand image being set at the location of the timepiece in the map image.

20 Claims, 11 Drawing Sheets

(51) Int. Cl.

| | | |
|---|---|---|
| *G04G 9/04* | (2006.01) | |
| *G04G 21/00* | (2010.01) | |
| *G04G 9/02* | (2006.01) | |
| *G06T 3/40* | (2006.01) | |
| *G06T 11/60* | (2006.01) | |
| *G06T 3/60* | (2006.01) | |
| *G06T 13/80* | (2011.01) | |
| *G06T 11/00* | (2006.01) | |

(52) U.S. Cl.
CPC ............ *G04G 99/006* (2013.01); *G06T 3/40* (2013.01); *G06T 3/60* (2013.01); *G06T 11/00* (2013.01); *G06T 11/60* (2013.01); *G06T 13/80* (2013.01)

(56) References Cited

U.S. PATENT DOCUMENTS

| | | | |
|---|---|---|---|
| 2012/0081281 A1 | 4/2012 | Morichika | |
| 2013/0262359 A1 | 10/2013 | Sambongi | |
| 2014/0058812 A1 | 2/2014 | Bender et al. | |
| 2015/0149117 A1 | 5/2015 | Kita | |
| 2016/0343156 A1 | 11/2016 | Yoshizawa | |
| 2017/0034288 A1 | 2/2017 | Nakadaira | |
| 2018/0140927 A1* | 5/2018 | Kito | G16H 20/30 |
| 2018/0181081 A1 | 6/2018 | Imamura | |
| 2018/0181800 A1 | 6/2018 | Imamura | |

FOREIGN PATENT DOCUMENTS

| | | |
|---|---|---|
| CN | 104572171 A | 4/2015 |
| CN | 105917329 A | 8/2016 |
| JP | S57-34484 A | 2/1982 |
| JP | H06-86023 U | 12/1994 |
| JP | H9-16074 A | 1/1997 |
| JP | H183531 A | 3/1999 |
| JP | 2001-027681 A | 1/2001 |
| JP | 2002-358162 A | 12/2002 |
| JP | 2004286496 A | 10/2004 |
| JP | 2004297356 A | 10/2004 |
| JP | 2005-106483 A | 4/2005 |
| JP | 2005331294 A | 12/2005 |
| JP | 2011117943 A | 6/2011 |
| JP | 2012-189531 A | 10/2012 |
| JP | 2013130918 A | 7/2013 |
| JP | 2014157076 A | 8/2014 |
| JP | 2015-195830 A | 11/2015 |

OTHER PUBLICATIONS

Japanese Office Action dated Oct. 23, 2018 in a counterpart Japanese patent application No. 2016-249099. (A machine translation (not reviewed for accuracy) attached. Cited in the related U.S. Appl. No. 15/794,749.).

Extended European Search Report (EESR) dated Mar. 1, 2018, in counterpart European patent application No. 17198837.1. (Cited in the related U.S. Appl. No. 15/794,749.).

Chinese Office Action dated Sep. 2, 2019 in a counterpart Chinese patent application No. 201711454743.6. (A machine translation (not reviewed for accuracy) attached.).

* cited by examiner

TIMEPIECE, METHOD OF DISPLAY CONTROL, AND STORAGE MEDIUM

BACKGROUND OF THE INVENTION

Technical Field

The present invention relates to a timepiece, a method of display control, and a storage medium.

Background Art

There are conventional wrist-type display devices that simulate an analog clock by displaying an analog clock in which the time is shown using clock hand images in order to allow a user to read the time, as described in Japanese Patent Application Laid-Open Publication No. 2012-189531.

SUMMARY OF THE INVENTION

The present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic device, including: one or more processors; and a display unit controlled by said one or more processors, wherein said one or more processors perform: obtaining a clock hand image; obtaining positional information indicating a location of the electronic device; and controlling the display unit to display a map image that includes said location of the electronic device and to display the clock hand image superimposed onto the map image in such a rotated manner as to indicate a time, a center of rotation of the clock hand image being set at said location of the electronic device in the map image.

In another aspect, the present disclosure provides a method performed by one or more processors in an electronic device having a display unit controlled by said one or more processors, the method including: obtaining a clock hand image; obtaining positional information indicating a location of the electronic device; and controlling the display unit to display a map image that includes said location of the electronic device and to display the clock hand image superimposed onto the map image in such a rotated manner as to indicate a time, a center of rotation of the clock hand image being set at said location of the electronic device in the map image.

In another aspect, the present disclosure provides a computer-readable non-transitory storage medium having stored therein a program that causes one or more processors in an electronic device having a display unit controlled by said one or more processors to perform: obtaining a clock hand image; obtaining positional information indicating a location of the electronic device; and controlling the display unit to display a map image that includes said location of the electronic device and to display the clock hand image superimposed onto the map image in such a rotated manner as to indicate a time, a center of rotation of the clock hand image being set at said location of the electronic device in the map image.

Here, in the above aspects, the location of the electronic device may be a future location of the electronic device at a future time indicated by a schedule, or a current location of the electronic device at a current time.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The detailed descriptions below are intended to be read with reference to the following figures in order to gain a deeper understanding of the present application.

DETAILED DESCRIPTION OF EMBODIMENTS

Next, an embodiment of the present invention will be described with reference to figures.

Figure 1:
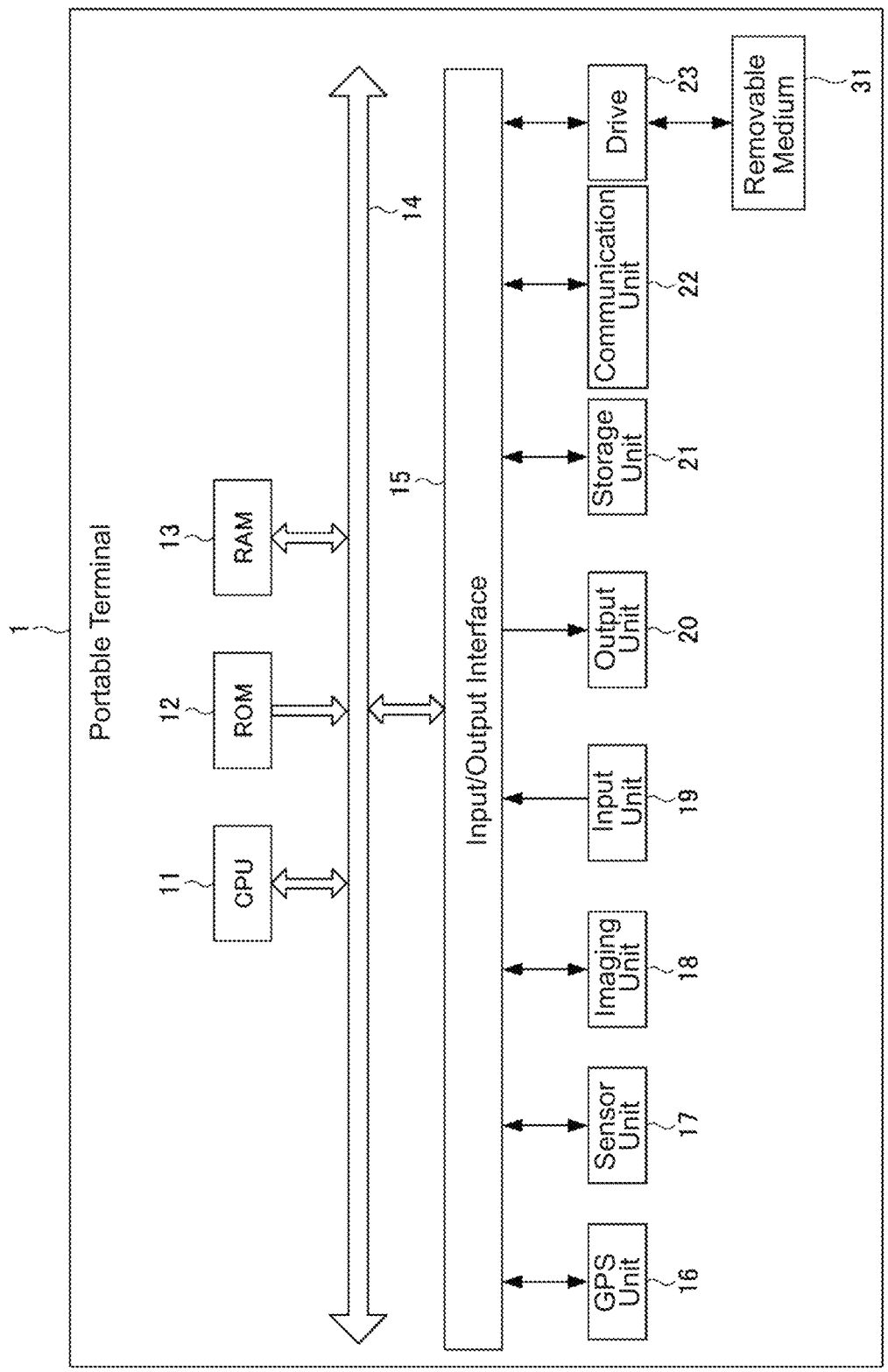
FIG. 1 is a block diagram illustrating a hardware configuration of a portable terminal 1 according to one embodiment of a timepiece in an electronic device of the present invention.

FIG. 1 is a block diagram illustrating a hardware configuration of a portable terminal 1 according to one embodiment of a timepiece of an electronic device of the present invention.

The portable terminal 1 is configured as a smartwatch, for example.

As illustrated in FIG. 1, the portable terminal 1 includes a central processing unit (CPU) 11, a read-only memory (ROM) 12, a random-access memory (RAM) 13, a bus 14, an input/output interface 15, a GPS unit 16, a sensor unit 17, an imaging unit 18, an input unit 19, an output unit 20, a storage unit 21, a communication unit 22, and a drive 23.

The CPU 11 executes various processes in accordance with programs stored in the ROM 12 or programs loaded into the RAM 13 from the storage unit 21.

The RAM 13 also appropriately stores any data or the like that the CPU 11 needs to execute these various processes.

The CPU 11, the ROM 12, and the RAM 13 are connected to one another via the bus 14. Moreover, the input/output interface 15 is also connected to the bus 14. The GPS unit 16, the sensor unit 17, the imaging unit 18, the input unit 19, the output unit 20, the storage unit 21, the communication unit 22, and the drive 23 are connected to the input/output interface 15.

The GPS unit 16 receives GPS signals from a plurality of GPS satellites via a GPS receiving antenna (not illustrated in the figure). The CPU 11, on the basis of the GPS signals received by the GPS unit 16, obtains positional information such as latitude, longitude, and elevation information that indicates the current location of the device.

The sensor unit 17 performs various sensing operations related to gyroscopic information, acceleration, geomagnetism, and GPS and outputs orientation information and positional information.

The imaging unit 18 includes an optical lens unit and an image sensor (not illustrated in the figure).

The optical lens unit is made of a lens for collecting light to image a subject, such as a focusing lens or a zoom lens, for example.

A focusing lens is a lens that forms an image of the subject onto the light-receiving face of the image sensor. A zoom lens is a lens that allows focal length to be freely changed within a certain range.

The optical lens unit also includes a peripheral circuit for adjusting setting parameters such as focal point, exposure, and white balance as necessary.

The image sensor is a photoelectric conversion element, an analog front-end (AFE), or the like.

The photoelectric conversion element is a complementary metal-oxide-semiconductor (CMOS) photoelectric conversion element or the like, for example. The subject image from the optical lens unit enters the photoelectric conversion element. The photoelectric conversion element then photoelectrically converts (images) the subject image, stores an image signal for a prescribed period of time, and sequentially supplies the stored image signal to the AFE as an analog signal.

The AFE executes various types of signal processing such as an analog-to-digital (A/D) conversion process on this analog image signal. These various types of signal processing yield a digital signal, which the imaging unit 18 outputs as an output signal.

The output signal of the imaging unit 18 is then supplied as appropriate to the CPU 11 or an image processor or the like (not illustrated in the figure) as captured image data.

The input unit 19 is made of various types of buttons or the like and inputs various types of information in accordance with user input operations.

The output unit 20 is made of a display, speakers and the like and outputs images and sound.

In the present embodiment, an input unit 19 to which input operations such as taps and swipes can be input is arranged layered together with an output unit 20, which serves as a display that displays images, icons, and the like, in order to form a touch panel interface.

The storage unit 21 is a hard disk or a dynamic random-access memory (DRAM), for example, and stores various types of image data.

The communication unit 22 controls communication with other devices (not illustrated in the figure) via a network such as the internet.

The drive 23 accepts, as appropriate, a removable medium 31 such as a magnetic disk, an optical disk, a magneto-optical disk, or semiconductor memory. Programs read from the removable medium 31 by the drive 23 are installed to the storage unit 21 as necessary. Moreover, similar to the storage unit 21, the removable medium 31 can store various types of data such as the image data stored in the storage unit 21.

The portable terminal 1 configured as described above has a clock display (hereinafter, "analog clock display") feature that simulates an analog clock by displaying clock hand images in accordance with the time as well as a feature for displaying a map of a prescribed range behind the clock hand images (hereinafter, "map display"). Moreover, a display in which the map display is displayed behind the analog clock display will hereinafter be referred to as an "analog clock and map display."

In the analog clock and map display of the present embodiment, the center of the display region is set as the center of rotation of the clock hand images and is also set to a prescribed location such as a specified location or the current location. Therefore, the user can read the analog clock without discomfort and can also intuitively comprehend the prescribed location and map information for the area surrounding the prescribed location.

Figure 2A:
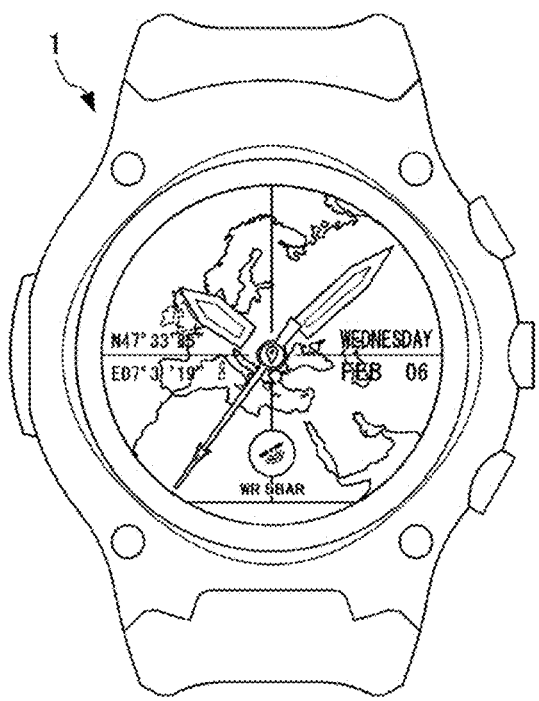
FIGS. 2A and 2B are schematic drawings illustrating display examples for an analog clock and map display of the embodiment.
Figure 2B:
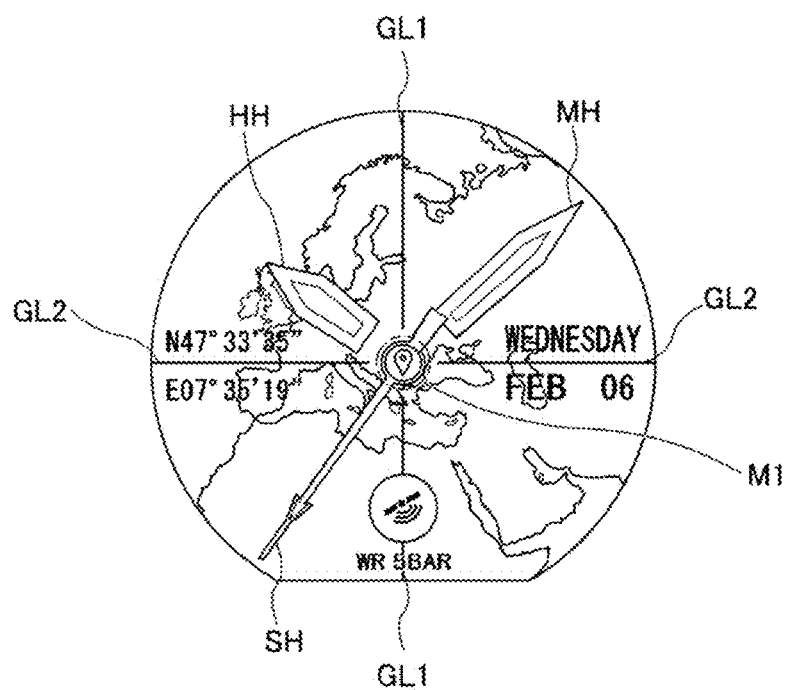
Figure 3A:
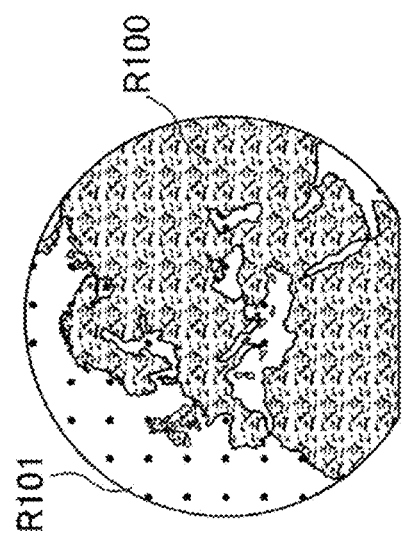
FIGS. 3A and 3B are schematic drawings illustrating display examples for the analog clock and map display of the embodiment.
Figure 3B:
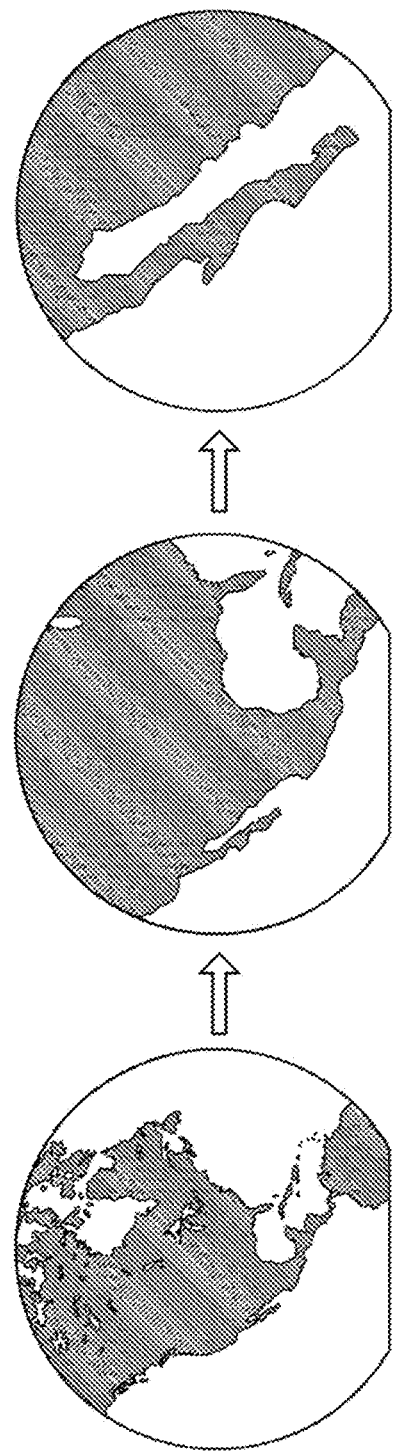

FIGS. 2A and 2B as well as FIGS. 3A and 3B are schematic drawings illustrating display examples for the analog clock and map display of the present embodiment.

As illustrated in FIG. 2A, in the analog clock and map display, the upward direction on the display screen of the portable terminal 1 in the normal position in which the display screen faces the user is the 12 o'clock direction of the analog clock display and is displayed as the north cardinal direction of the map display.

In the analog clock display, every revolution of an hour hand indicates that 12 hours have elapsed, every revolution of a clock hand image for a minute hand indicates that 60 minutes have elapsed, and every revolution of a seconds hand indicates that 60 seconds have elapsed.

The map display is adjusted such that a prescribed map region centered on a prescribed location fits to scale and is to be displayed in the display region. In the present embodiment, the prescribed location is the current location, and the prescribed map region is a region including the position where the user was at the same time on the previous day and a peripheral region which has the current location as the center of the display region.

Moreover, the map display may be configured such that the display changes in accordance with the orientation of the display screen to match the actual cardinal directions.

Furthermore, as illustrated in FIG. 2B, a mark M1 that indicates the current location is displayed at the current location on the map, which is at the center of the display region. In the present embodiment, the current location and the center of rotation of the clock hand images are both at the same position, and therefore the mark M1 is displayed over the clock hand image for the seconds hand in a natural manner.

Moreover, orthogonal guide lines GL1 and GL2 are displayed running through the center of the display region (the current location and the center of rotation of the clock hand images). Near the guide lines GL1 and GL2, latitude and longitude values are displayed indicating the positions of the guide lines GL1 and GL2 on the map. This allows the user to easily see the latitude and longitude of the current location, which corresponds to the position of the intersection between the guide lines GL1 and GL2.

Furthermore, the date and week corresponding to the time are displayed at a position symmetric to the display of the latitude and longitude values.

In addition, the map display may be configured to display a path of movement since a prescribed prior time (such as the previous day).

Moreover, as illustrated in FIG. 3A, a land region R100 or an ocean region R101 may be displayed separately in the map display. Furthermore, elevation, temperature, time zone, day/night (day, afternoon, or night), season, and latitude and longitude may also be displayed separately.

In addition, in accordance with the prescribed location (in the present embodiment, the current location), a design such as a design representative of the country to which the current location belongs may be changed, the time may be changed to match that in the prescribed location, or the display language may be changed accordingly, for example.

As illustrated in FIG. 3B, at the initiation of the analog clock display, when displaying the final prescribed map region, a zoom animation is performed starting from a position overlooking the prescribed map region from far away and then gradually drawing closer to the prescribed map region. Furthermore, during this animation, clouds may initially be displayed, and then an effect of gradually passing through the clouds while gradually drawing closer from a position overlooking the prescribed map region from far away to the prescribed map region may be displayed. In addition, the zoom speed may be changed in accordance with the size of the prescribed map region to be displayed.

Figure 4:
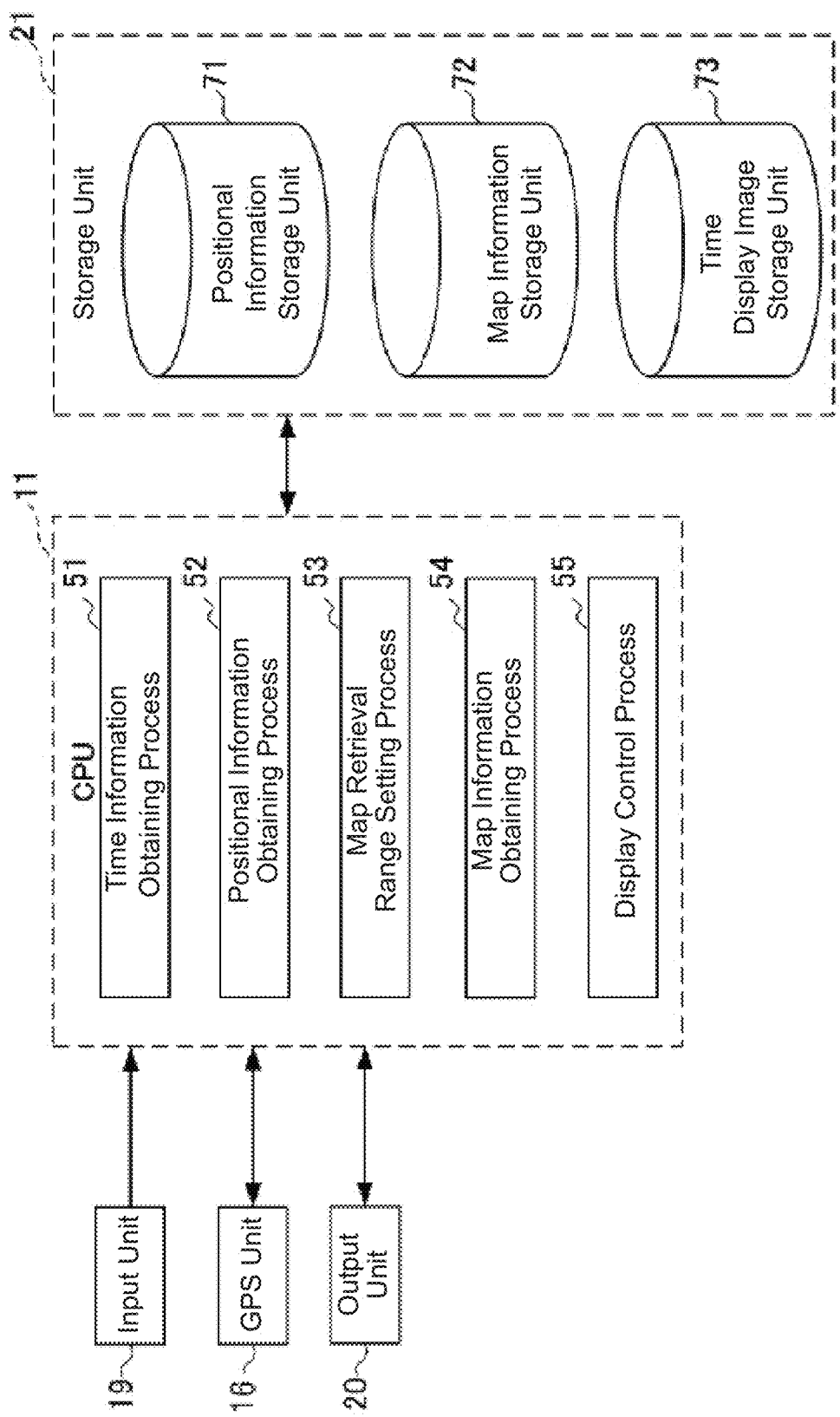
FIG. 4 is a functional block diagram illustrating, among functional configurations of the portable terminal 1 illustrated in FIG. 1, a functional configuration for executing an analog clock and map display process.

FIG. 4 is a functional block diagram illustrating, among functional configurations of the portable terminal 1 illustrated in FIG. 1, a functional configuration for executing an analog clock and map display process.

The "analog clock and map display process" refers to a sequence of processes in which a map image centered on a prescribed location is displayed in the background of the analog clock display.

As illustrated in FIG. 4, when executing the analog clock and map display process, the CPU 11 performs a time information obtaining process 51, a positional information obtaining process 52, a map retrieval range setting process 53, a map information obtaining process 54, and a display control process 55.

Moreover, a positional information storage unit 71, a map information storage unit 72, and a time display image storage unit 73 are configured in a region of the storage unit 21.

The positional information storage unit 71 stores positional information that is sequentially obtained by the GPS unit 16. A history including at least the current positional information and the positional information from the same time on the previous day is stored.

The map information storage unit 72 stores map information including map images.

The time display image storage unit 73 stores data for time display image including, for example, clock hand images, such as a short hand, a long hand, and a seconds hand, necessary for analog clock display, time index images, and the like.

The time information obtaining process 51 obtains the current time kept by the CPU 11 or the like.

The positional information obtaining process 52 obtains the current positional information output from the GPS unit 16 as well as positional information from a prescribed time in the past that was stored in the positional information storage unit 71. In the present embodiment, the positional information from the same time on the previous day (one day prior) is obtained as the information for the prescribed time in the past.

The map retrieval range setting process 53 sets the range for the map retrieval on the basis of the current positional information and the positional information from the prescribed time in the past that were obtained. In the present embodiment, a range including the current location and a prescribed location from the past is set as the retrieval range. For example, the map retrieval range setting process 53 sets the map range in accordance with a total movement distance (that is, movement distance along a movement path) between the current positional information and the positional information from the prescribed time in the past that were obtained. In other words, as a result, a map of a range corresponding to the total movement distance (movement distance along a movement path) is displayed.

The map information obtaining process 54 obtains a map image for the range set by the map retrieval range setting process 53 from the map information storage unit 72. In the present embodiment, a map image for the range including the current location and a prescribed location from the past is obtained.

The display control unit 55 controls the output unit 20 so as to display images.

The display control unit 55 controls the output unit 20 so as to display an animation that shows a map image of a wider range than the range set by the map retrieval range setting process 53 and then gradually zooms in such that the final display state shows the map image for the set range, so as to display the obtained map image behind the clock hand images, and so as to display guides, for example. As a result, the output unit 20 displays display states such as those illustrated in FIGS. 2A and 2B.

Figure 5:
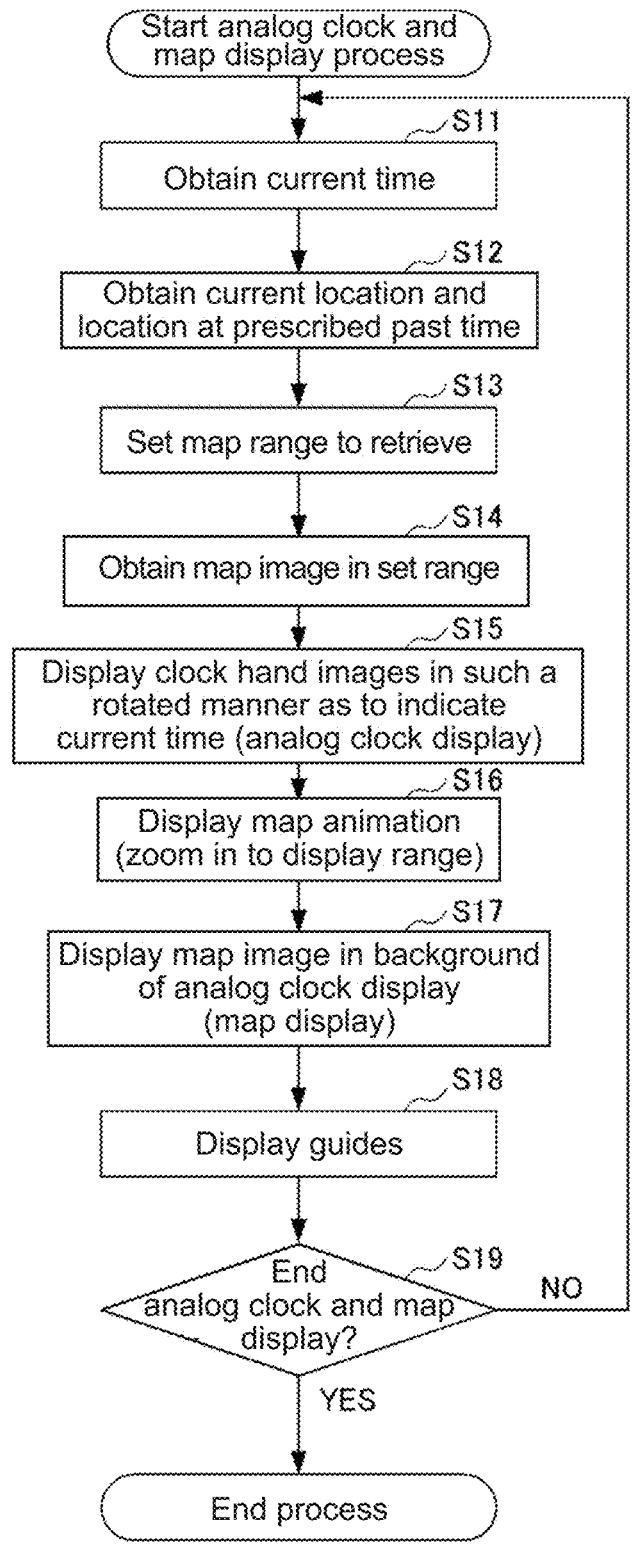
FIG. 5 is a flowchart illustrating the flow of the analog clock and map display process executed by the portable terminal 1 illustrated in FIG. 1 and having the functional configuration illustrated in FIG. 4.

FIG. 5 is a flowchart illustrating the flow of the analog clock and map display process executed by the portable terminal 1 illustrated in FIG. 1 and having the functional configuration illustrated in FIG. 4.

The analog clock and map display process begins when the user inputs an analog clock and map display process start operation to the input unit 19.

In step S11, the time information obtaining process 51 obtains the current time.

In step S12, the positional information obtaining process 52 obtains the current positional information output from the GPS unit 16 as well as positional information from a prescribed time in the past (in the present embodiment, the same time on the previous day) that is stored in the positional information storage unit 71.

In step S13, the map retrieval range setting process 53 sets the range for the map to retrieve on the basis of the current positional information and the positional information from the prescribed time in the past that were obtained. For example, the map retrieval range setting process 53 sets the range for the map to retrieve in accordance with a total movement distance (that is, movement distance along a movement path) between the current positional information and the positional information for the prescribed time in the past that were obtained by the positional information obtaining process 52.

In step S14, the map information obtaining process 54 obtains, from the map information storage unit 72, a map image including the current location and the obtained location for the prescribed time in the past (in the present embodiment, the location from the same time on the previous day).

In step S15, the display control unit 55 controls the output unit 20 so as to arrange and display the clock hand images stored in the time display image storage unit 73 in accordance with the current time (analog clock display).

In step S16, the display control unit 55 controls the output unit 20 so as to display an animation that zooms in on a map image until the obtained map image is ultimately shown. For example, to achieve an effect of zooming in from a position overlooking the prescribed location as if from space, the displayed animation includes displaying clouds and then displaying an animation of passing through the clouds and zooming in to the scale at which the map will ultimately be displayed.

Alternatively, for the image that is displayed when starting the zoom animation process, instead of displaying an image of an overhead view of the prescribed location from space, the animation process may start by zooming in from displaying a map image of a display range corresponding to the movement range since a prescribed time (such as the previous day) and then display the map image to be ultimately displayed.

In step S17, the display control unit 55 controls the output unit 20 so as to display the obtained map image behind the clock hand images (map display).

In step S18, the display control unit 55 controls the output unit 20 so as to display guides at prescribed positions. As a result, as illustrated in FIGS. 2A and 2B, the guide lines GL1 and GL2 showing latitude and longitude, the latitude and longitude values, the date, and the like are displayed on the map image.

In step S19, the CPU 11 determines whether to end analog clock and map display on the basis of whether the user has input a stop operation or the like to the input unit 19, for example.

If analog clock and map display does not need to be ended, the determination in step S19 yields NO, and the process returns to step S11.

If analog clock and map display needs to be ended, the determination in step S19 yields YES, and analog clock and map display is ended.

Embodiment 2

Next, Embodiment 2 of the present invention will be described.

The portable terminal 1 according to Embodiment 1 sets the range for the map to retrieve based on the current positional information and positional information from a prescribed time in the past and displays an analog clock and map. In contrast, a portable terminal 1 according to the present embodiment displays an analog clock and map by obtaining a map of an area surrounding a destination specified in a schedule and then displaying the obtained map behind clock hand images.

Therefore, the hardware configuration of the portable terminal 1 according to the present embodiment is the same as that illustrated in FIG. 1 for Embodiment 1. Moreover, the functional configuration of the portable terminal 1 according to the present embodiment is different from that of Embodiment 1 in that the CPU 11 performs a schedule information obtaining process 53A and a map update condition determination process 53B instead of the map retrieval range setting process 53 of the functional configuration of Embodiment 1 illustrated in FIG. 4, and also in that a schedule information storage unit 74 is included. The following description focuses primarily on the portions that are different from those in Embodiment 1.

Figure 6:
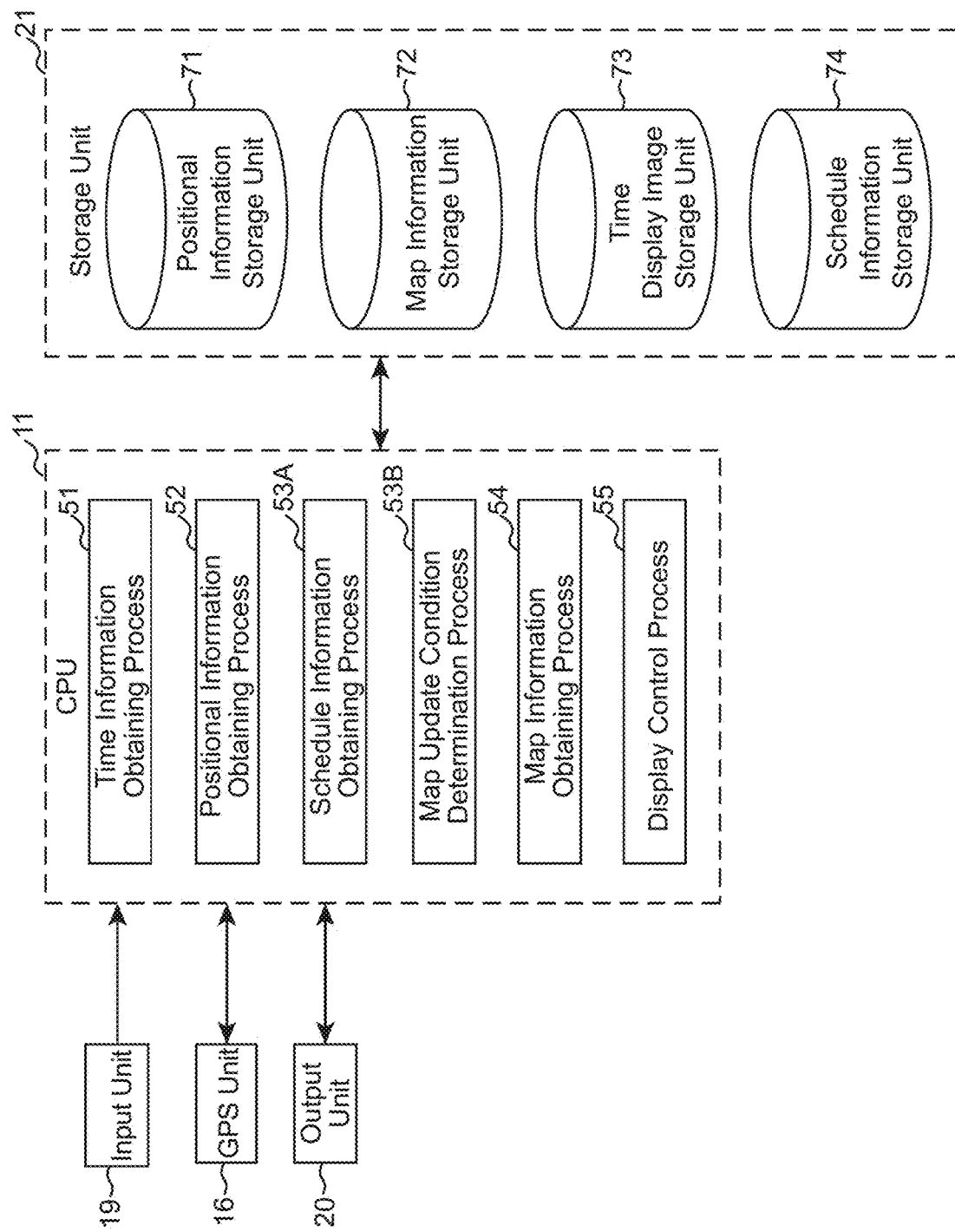
FIG. 6 is a functional block diagram illustrating, among functional configurations of the portable terminal illustrated in FIG. 1, a functional configuration for executing an analog clock and map display process of Embodiment 2.

FIG. 6 is a functional block diagram illustrating, among the functional configuration of the portable terminal 1 illustrated in FIG. 1, a functional configuration for executing an analog clock and map display process of Embodiment 2.

In the analog clock and map display process of Embodiment 2, a map of an area surrounding a destination specified in a schedule is obtained, and then a map image centered on the destination is displayed in the background of an analog clock display.

The schedule information storage unit 74 stores schedule-related information (schedule data) of a user which is the target for the analog clock and map display process. Various types of data can be obtained and stored as schedule data, such as data on the portable terminal 1, data from electronic devices such as smartphones to which the portable terminal 1 is connected, or data stored on the cloud. Moreover, in addition to data that is explicitly stored as a schedule, data that indirectly indicates a schedule (such as transportation ticket data) can also be included. Note that the schedule data used here includes positional information from which latitude and longitude can be determined.

The schedule information obtaining process 53A obtains the user's schedule data at a specified update timing (such as every three hours, for example). The schedule information obtaining process 53A also stores the obtained user schedule data in the schedule information storage unit 74. Moreover, in the present embodiment, the destinations for schedules stored in the schedule information storage unit 74 are targets for positional information to be obtained by the positional information obtaining process 52.

The map update condition determination process 53B determines, on the basis of the user's current positional information, the current time, and the destination and schedule date and time indicated in the schedule data, whether a condition (hereinafter, a "map update condition") for updating the map image displayed in the background of the analog clock display has been satisfied. In the present embodiment, the map update condition is determined as having been satisfied when a schedule that is closest to the current time is newly detected from among schedules for which the schedule start date and time is within a first threshold period (here, 90 days) from the current time and the destination is separated from the current location by at least a first threshold distance (here, 30 km) in terms of linear distance.

Moreover, for a schedule for which a map image is displayed when it is determined that the map update condition has been satisfied, if the current time is within a second threshold period (here, six hours) prior to the start of the schedule, map image updates are locked, even if another schedule satisfying the map update condition is newly detected. Therefore, when schedules are configured in a consecutive manner, it is possible to prevent situations in which each time the user gets close to the current destination, the display is updated to the map image for the next location and the user can no longer refer to the map image for the current destination. However, in the present embodiment, once the user's current location is within a second threshold distance (here, 2 km) from the schedule destination in terms of linear distance, it is determined that the user has arrived at the destination, and the lock on map image updates is cleared. Furthermore, for the condition that determines that the user has arrived at the destination, as an alternative to determining whether the user's current location is within the second threshold distance from the schedule destination, it may be determined whether the current time is within a third threshold period (such as one hour) from the end time of the schedule.

When the map update condition determination process 53B determines that the map update condition has been satisfied, the display control unit 55 updates the map image displayed in the background of the analog clock display to a map image centered on the destination of the schedule that satisfied the map update condition.

Figure 7:
FIG. 7 is a schematic drawing illustrating a display example of an analog clock and map display in which a map image centered on a destination of a schedule satisfying a map update condition is set.

Due to this configuration, in the present embodiment, when it is determined that the map update condition has been satisfied, the analog clock and map are displayed as illustrated in FIG. 7, for example.

FIG. 7 is a schematic drawing illustrating a display example of an analog clock and map display in which a map image centered on the destination of a schedule satisfying the map update condition is set.

In the display example illustrated in FIG. 7, X Airport is the destination of the next schedule, and the analog clock and map display has a map image centered on X Airport as the background. Moreover, a display region (hereinafter, a "remaining information display region") including the remaining time (in days) until the start date and time of the next schedule as well as the remaining distance to the destination of the next schedule is displayed at the 12 o'clock position on the analog clock and map display, and an arrow pointing in a direction drawn going from the current location towards the destination is also displayed.

In the display example state illustrated in FIG. 7, once the current time is within the second threshold period from the start date and time of the next schedule, map image updates are locked, and the map image for the current destination is maintained even if a schedule satisfying the map update condition is then newly detected. Moreover, as the user approaches the destination in accordance with the schedule, once the current location is within the second threshold distance from the current destination in terms of linear distance, it is determined that the user has arrived at the destination, and the display is updated to a map image centered on the destination of the next schedule.

Figure 8:
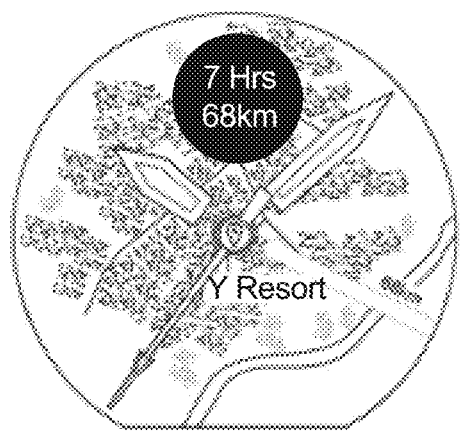
FIG. 8 is a schematic drawing illustrating a display example in which a map image centered on X Airport has been updated to a map image centered on the destination of a next schedule (Y Resort).

FIG. 8 is a schematic drawing illustrating a display example in which the map image centered on X Airport has been updated to a map image centered on the destination of the next schedule (Y Resort).

In the display example illustrated in FIG. 8, a map image centered on Y Resort (the next destination) is displayed, and the remaining time (7 hours) until the next schedule as well as the remaining distance (68 km) to the destination of the next schedule are displayed in the remaining information display region. Furthermore, an arrow pointing in a direction drawn going from X Airport towards Y Resort is displayed.

Here, because the first threshold distance is set to the map update condition, schedules for which the specified destination is within the first threshold distance from X Airport (or more specifically, the user's current location) in FIG. 7 in terms of linear distance are determined to not satisfy the map update condition.

For example, if a schedule with a destination of Q Park at a location 5 km from X Airport was configured between the schedule with a destination of X Airport and the schedule with a destination of Y Resort, due to the linear distance from X Airport being equal to or less than the first threshold distance (30 km), it would be determined that the schedule with a destination of Q Park does not satisfy the map update condition, and a map image centered on Q Park would not be displayed.

This makes it possible to prevent situations in which the map display is updated frequently due to auxiliary schedules in areas surrounding the current destination having been determined to satisfy the map update condition.

Furthermore, in the display example state illustrated in FIG. 8, once the user approaches to within the second threshold distance from Y Resort in terms of linear distance after approximately seven hours in accordance with the schedule, the display is updated to a map image centered on Z Scenic Overlook, which is newly detected as the next schedule satisfying the map update condition.

Figure 9:
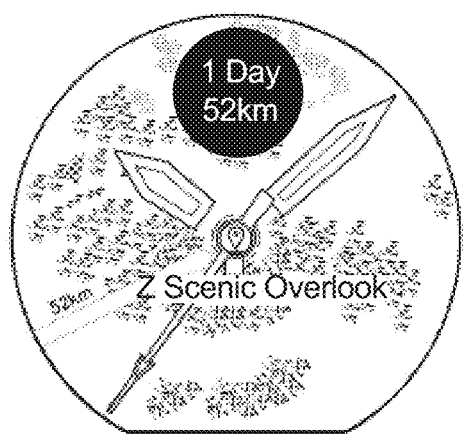
FIG. 9 is a schematic drawing illustrating a display example in which the map image centered on Y Resort has been updated to a map image centered on the destination of a next schedule (Z Scenic Overlook).

FIG. 9 is a schematic drawing illustrating a display example in which the map image centered on Y Resort has been updated to a map image centered on the destination of the next schedule (Z Scenic Overlook).

In the display example illustrated in FIG. 9, a map image centered on Z Scenic Overlook (the next destination) is displayed, and the remaining time (1 day) until the next schedule as well as the remaining distance (52 km) to the destination of the next schedule are displayed in the remaining information display region. Furthermore, an arrow pointing in a direction drawn going from Y Resort towards Z Scenic Overlook is displayed.

Figure 10:
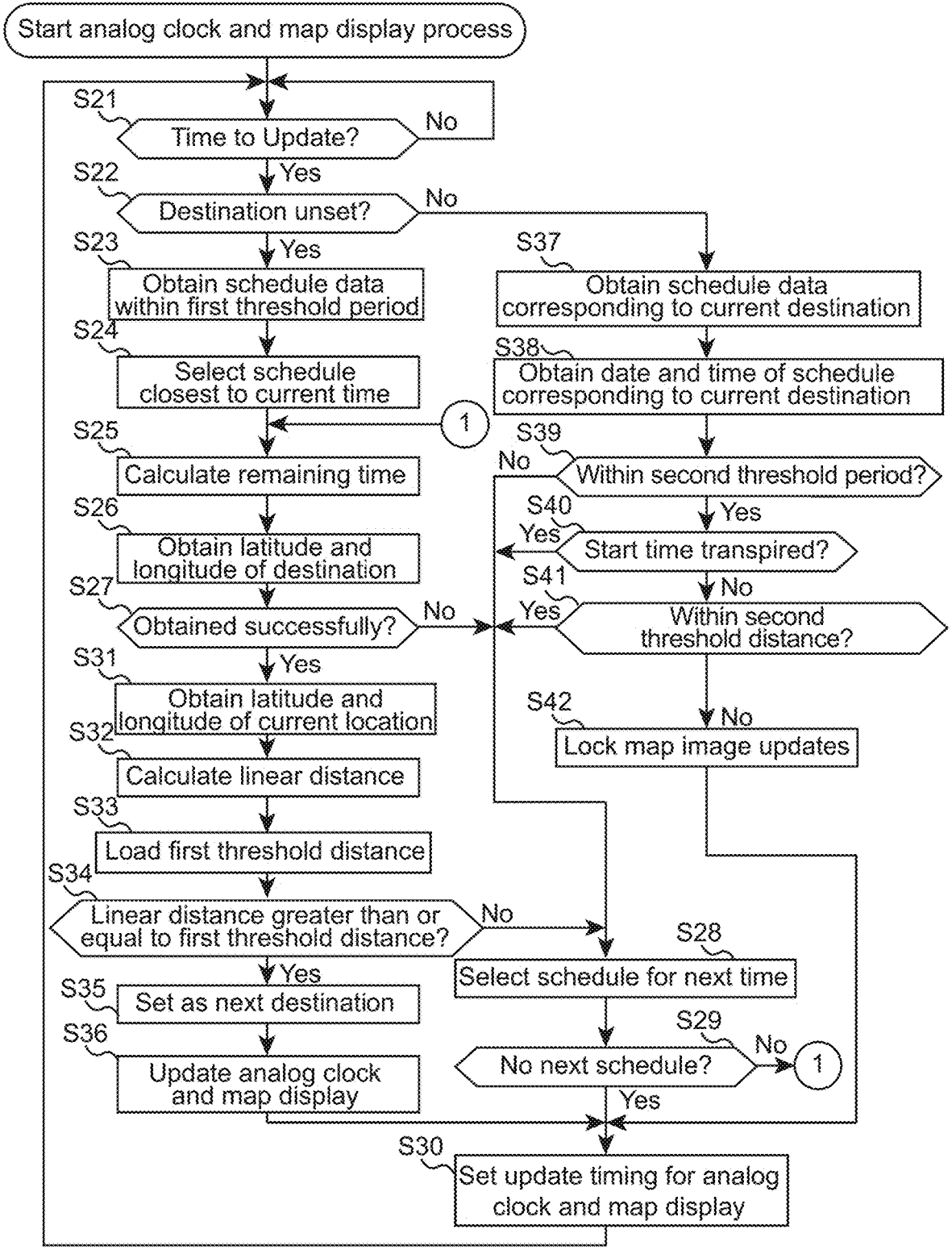
FIG. 10 is a flowchart illustrating the flow of an analog clock and map display process of Embodiment 2 as executed by the portable terminal illustrated in FIG. 1 and having the functional configuration illustrated in FIG. 6.

FIG. 10 is a flowchart illustrating the flow of the analog clock and map display process of Embodiment 2 as executed by the portable terminal 1 illustrated in FIG. 1 and having the functional configuration illustrated in FIG. 6.

The analog clock and map display process of Embodiment 2 begins when the user inputs an analog clock and map display process start operation to the input unit 19.

In step S21, the schedule information obtaining process 53A determines whether the specified update timing (such as every three hours, for example) has elapsed.

If the specified update timing has elapsed, the determination in step S21 yields YES, and the process proceeds to step S22.

If the specified update timing has not elapsed, the determination in step S21 yields NO, and the process in step S21 is repeated.

In step S22, the schedule information obtaining process 53A determines whether the destination is unset. If the destination has been set, the determination in step S22 yields NO, and the process proceeds to step S37.

If the destination is currently unset, the determination in step S22 yields YES, and the process proceeds to step S23.

In step S23, the schedule information obtaining process 53A obtains user schedule data that is within the first threshold period from the current time.

In step S24, the schedule information obtaining process 53A selects the schedule that is closest to the current time.

In step S25, the map update condition determination process 53B calculates the remaining time (in days).

In step S26, the positional information obtaining process 52 obtains the latitude and longitude of the destination on the basis of the schedule data.

In step S27, the map update condition determination process 53B determines whether the latitude and longitude of the destination were successfully obtained.

If the latitude and longitude of the destination were successfully obtained, the determination in step S27 yields YES, and the process proceeds to step S31.

If the latitude and longitude of the destination were not successfully obtained, the determination in step S27 yields NO, and the process proceeds to step S28.

In step S28, the schedule information obtaining process 53A selects the schedule for the next time.

In step S29, the schedule information obtaining process 53A determines whether there is no schedule data for the next time.

If there is no schedule data for the next time, the determination in step S29 yields YES, and the process proceeds to step S30.

If there is schedule data for the next time, the determination in step S29 yields NO, and the process proceeds to step S25.

In step S30, the schedule information obtaining process 53A sets an update timing (such as 10 minutes later) for the analog clock and map display.

After step S30, the process proceeds to step S21.

In step S31, the positional information obtaining process 52 obtains the latitude and longitude of the current location.

In step S32, the map update condition determination process 53B calculates the linear distance between the current location and the destination on the basis of the latitude and longitude of the destination and the latitude and longitude of the current location.

In step S33, the map update condition determination process 53B loads the first threshold distance.

In step S34, the map update condition determination process 53B determines whether the linear distance between the current location and the destination is greater than or equal to the first threshold distance.

If the linear distance between the current location and the destination is greater than or equal to the first threshold distance, the determination in step S34 yields YES, and the process proceeds to step S35.

If the linear distance between the current location and the destination is not greater than or equal to the first threshold distance, the determination in step S34 yields NO, and the process proceeds to step S28.

In step S35, the map update condition determination process 53B sets the selected schedule data as the next destination.

In step S36, the display control unit 55 updates the analog clock and map display.

After step S36, the process proceeds to step S30.

In step S37, the schedule information obtaining process 53A obtains the user schedule data corresponding to the current destination. In step S38, the map update condition determination process 53B obtains the start date and time of the schedule corresponding to the current destination.

In step S39, the map update condition determination process 53B determines whether the current time is within the second threshold period prior to the start of the schedule.

If the current time is within the second threshold period prior to the start of the schedule, the determination in step S39 yields YES, and the process proceeds to step S40.

If the current time is not within the second threshold period prior to the start of the schedule, the determination in step S39 yields NO, and the process proceeds to step S28.

In step S40, the map update condition determination process 53B determines whether the start time of the schedule corresponding to the current destination has transpired.

If the start time of the schedule corresponding to the current destination has not transpired, the determination in step S40 yields NO, and the process proceeds to step S41.

If the start time of the schedule corresponding to the current destination has transpired, the determination in step S40 yields YES, and the process proceeds to step S28.

In step S41, the map update condition determination process 53B determines whether the current location is within the second threshold distance from the destination of the schedule in terms of linear distance.

If the current location is not within the second threshold distance from the destination of the schedule in terms of linear distance, the determination in step S41 yields NO, and the process proceeds to step S42.

If the current location is within the second threshold distance from the destination of the schedule in terms of linear distance, the determination in step S41 yields YES, and the process proceeds to step S28.

In step S42, the map update condition determination process 53B locks map image updates.

After step S42, the process proceeds to step S30.

In the portable terminal 1 according to Embodiment 2, the process described above makes it possible to display maps of areas surrounding the destinations specified for the user's schedules in the analog clock and map display prior to those schedules.

This makes it possible to provide information about the next destination to the user in advance.

Moreover, the schedule for which the destination is displayed in the analog clock and map display is the schedule closest to the current time from among schedules for which the schedule start date and time is within the first threshold period from the current time and the destination is separated from the current location by at least the first threshold distance in terms of linear distance. As a result, a map image for a schedule set for a prescribed upcoming period from the current time and a destination separated from the current location by a prescribed distance is displayed, which makes it possible to select and display the destination of the schedule appropriate for the user.

Furthermore, once the current time is within the second threshold period prior to the start of the schedule, map image updates are locked, even if another schedule satisfying the map update condition is newly detected.

Therefore, when schedules are configured in a consecutive manner, it is possible to prevent situations in which each time the current destination is approached, the display is updated to the map image for the next destination and the map image for the current destination is no longer available for reference.

In addition, after map image updates are locked, once the user's current location is within the second threshold distance from the schedule destination in terms of linear distance, it is determined that the user has arrived at the destination, and the lock on map image updates is cleared.

This makes it possible to prevent map image updates from continuing to remain locked.

Although in Embodiment 2 the current location is used to determine which destination to display in the analog clock and map display, a place of residence may be used instead of the current location. When using a place of residence, the user can input the location of the place of residence, or the portable terminal 1 can analyze the user's daily movements to estimate the location of the place of residence, for example.

Moreover, the configuration for locking map information updates in Embodiment 2 may be configured such that once the current time is within the second threshold period (here, six hours) prior to the start of schedules, updates are locked after changing to a map image corresponding to a schedule that is closest to the current time from among the schedules that are within the second threshold period prior to the start of the schedules, regardless of which map image is currently displayed.

Furthermore, the first threshold period, the first threshold distance, the second threshold distance, and the second threshold period may be freely settable by the user, or these values may be variably determined in an automatic manner by analyzing schedule content. For example, when a businessperson is using the portable terminal 1 according to the present disclosure for business purposes, cases in which the next destination is displayed for the shortest span possible are conceivable. In such cases, when displaying a map image corresponding to the next schedule, it may be good to display the image even if the linear distance between the destination and the current location is short. In these cases, upon analyzing the schedule content and determining that the schedule is business-related, the first threshold distance may be reduced accordingly (to five kilometers, for example), and the second threshold period may also be reduced (to two hours, for example). In addition, users may be allowed to freely set the threshold values in accordance with their own use cases.

Modification Example 1

Embodiment 1 was described using an example in which a map image of an area surrounding the current location and having a map range based on movement distance from the past to the present is displayed in the analog clock and map display, and Embodiment 2 was described using an example in which a map image of an area surrounding a schedule destination is displayed in the analog clock and map display.

As an alternative, a mode switching screen for switching between the analog clock and map display mode of Embodiment 1 and the analog clock and map display mode of Embodiment 2 may be displayed, and either analog clock and map display may be used in accordance with the mode selected by the user. This can be achieved using a configuration in which the schedule information obtaining process 53A, the map update condition determination process 53B, and the schedule information storage unit 74 in the functional configuration illustrated in FIG. 6 are added to the functional configuration illustrated in FIG. 4.

Implementing this type of configuration allows the user to, in accordance with the intended use case, select and display map images of areas surrounding the current location and having map ranges based on movement distance from the past to the present as well as map images of areas surrounding schedule destinations.

Modification Example 2

Embodiment 2 was described using an example in which the map images displayed in the analog clock and map display are set automatically in accordance with a map update condition.

As an alternative, the destination to be displayed in the analog clock and map display may be set manually.

Figure 11:
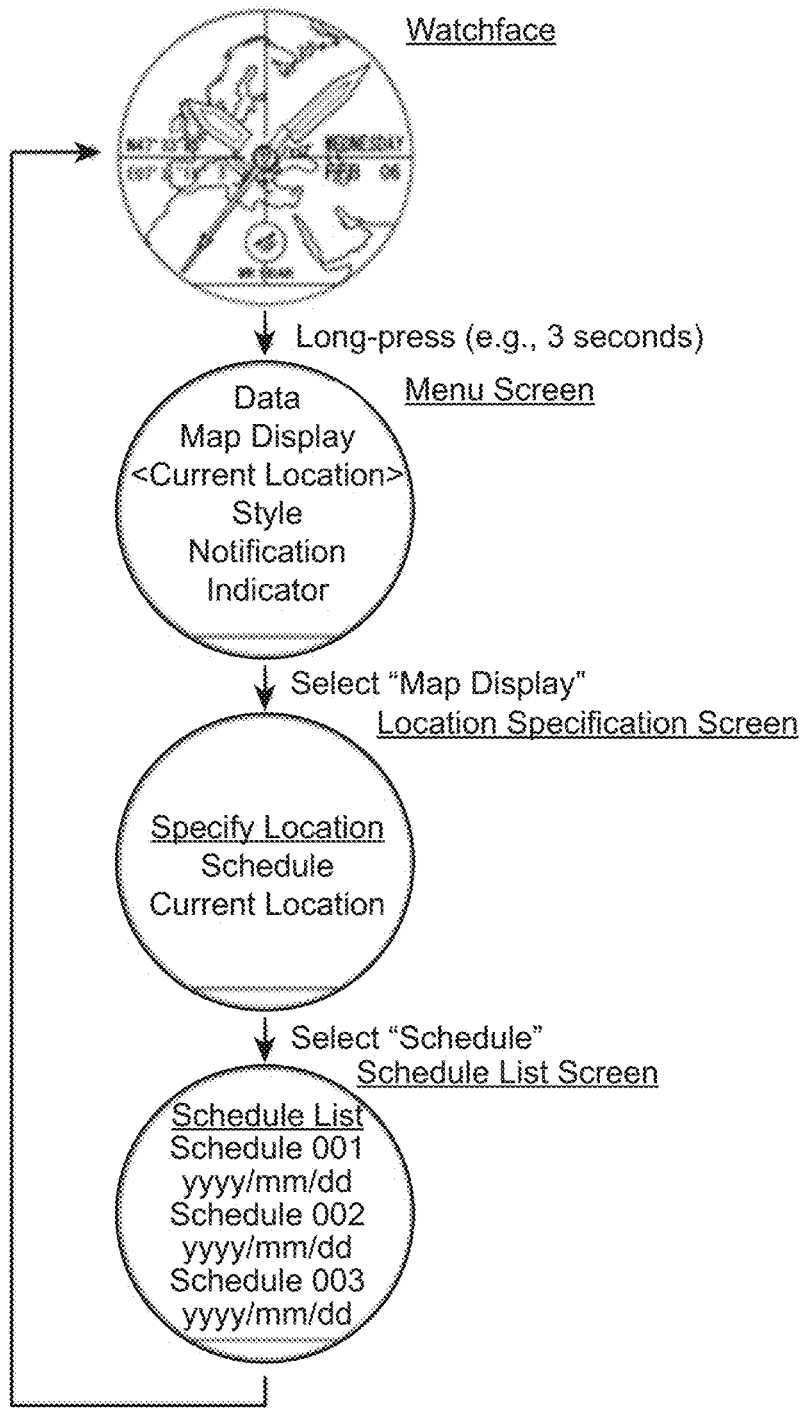
FIG. 11 is a schematic drawing illustrating a display screen transition example for when setting a destination manually.

FIG. 11 is a schematic drawing illustrating a display screen transition example for when setting a destination manually.

As illustrated in FIG. 11, in the case where the destination to be displayed in the analog clock and map display is manually set, when the user long-presses the watchface (for three seconds, for example), a menu screen is displayed by the display control unit 55. The menu screen displayed at this time is a display screen for selecting various types of items that the user can set manually.

Next, when the user selects "Map Display" on the menu screen, a screen for specifying the map area to display (a location specification screen) is displayed by the display control unit 55. On the location specification screen, the user can select "Current Location" to specify the current location or "Schedule" to specify a schedule destination.

Furthermore, when the user selects "Schedule" on the location specification screen, a screen (a schedule list screen) for selecting a schedule to set as the display target for the analog clock and map display is displayed by the display control unit 55. When "Current Location" is selected on the location specification screen, the display control unit 55 switches to a display screen in which an analog clock and map display centered on the calculated current location is set as the watchface. Meanwhile, on the schedule list selection screen, a list of the user's schedules is displayed, and the user can select any of the schedules. Various types of data can be used for the schedule data displayed at this point, such as data on the portable terminal 1, data from electronic devices such as smartphones to which the portable terminal 1 is connected, or data stored on the cloud. Moreover, this schedule data includes data for which addresses (positional information) explicitly entered by the user have been input.

Next, when the user selects any of the schedules on the schedule list screen, if the address (positional information) of a destination has been entered for that schedule, the display control unit 55 switches to a display screen in which an analog clock and map display centered on the destination of the selected schedule is set as the watchface. On this display screen, a map image centered on the destination of the selected schedule is displayed, and a pin indicating the position of that destination is displayed in the center of the display screen.

For map images for destinations manually specified by the user, the display state is maintained until the user performs an operation for switching the map image.

This makes it possible to cause map images for positions that the user wants to display to be displayed appropriately in accordance with the user's wishes.

The portable terminal 1 configured as described above is a timepiece, which is an electronic device including an output unit 20.

Moreover, the portable terminal 1 includes a positional information obtaining process 52 and a display control unit 55.

The positional information obtaining process 52 obtains positional information.

The display control unit 55 controls the output unit 20 so as to display a map image corresponding to the positional information obtained by the positional information obtaining process 52 and so as to display a clock hand image superimposed onto the map image in such a rotated manner as to indicate a time.

Therefore, in the portable terminal 1, it is possible to implement display control in a manner that, while maintaining the design aesthetics of an analog clock display, makes it possible to display a map image of a prescribed range.

The positional information obtaining process 52 obtains positional information for a current location of the device.

The display control unit 55 controls the output unit 20 so as to display a map image corresponding to the positional information for the current location and so as to display the clock hand image obtained by the clock hand image obtaining unit by superimposing the clock hand image onto at least a portion of the map image in such a rotated manner as to indicate a time.

Therefore, in the portable terminal 1, it is possible to implement display control in a manner that, while maintaining the design aesthetics of an analog clock display, makes it possible to display a map image of a prescribed range.

The display control unit 55 controls the output unit 20 so as to display the map image such that a location corresponding to the positional information is at a center of a display region.

Therefore, in the portable terminal 1, it is possible to implement display control in a manner that, while maintaining the design aesthetics of an analog clock display, makes it possible to display a map image of a prescribed range.

The display control unit 55 controls the output unit 20 so as to display the clock hand image such that a center of a display region is at a center of rotation of the clock hand image.

Therefore, in the portable terminal 1, it is possible to implement display control in a manner that, while maintaining the design aesthetics of an analog clock display, makes it possible to display a map image of a prescribed range.

The display control unit 55 controls the output unit 20 so as to display a guide line on the map image.

Therefore, in the portable terminal 1, it is possible to implement a map display in a manner that, while maintaining the design aesthetics of an analog clock display, allows a prescribed location to be intuitively ascertained.

The display control unit 55 displays a guide line indicating a prescribed direction at a center of rotation of the clock hand image.

Therefore, in the portable terminal 1, it is possible to implement a map display in a manner that, while maintaining the design aesthetics of an analog clock display, allows a prescribed location to be intuitively ascertained.

The display control unit 55 displays a prescribed time among times shown by the clock hand image so as to match a prescribed direction on the map image, and also displays a guide line on the clock hand image and a guide line on the map image in a shared manner corresponding to the matched time and direction.

Therefore, in the portable terminal 1, it is possible to implement a map display in a manner that, while maintaining the design aesthetics of an analog clock display, allows a prescribed location to be intuitively ascertained.

The positional information obtaining process 52 obtains information related to a movement range of a user.

The display control unit 55 controls the output unit 20 so as to display an image corresponding to the movement range obtained by the positional information obtaining unit and to the positional information.

Therefore, in the portable terminal 1, it is possible to implement a map display in a manner that, while maintaining the design aesthetics of an analog clock display, allows a prescribed location to be intuitively ascertained.

During map display, the display control unit 55 causes to be displayed, in a manner incorporating an animation, a process of transitioning between two map display screens, these being a first map display screen that displays a map image corresponding to the positional information and a second map display screen that displays a map image of a wider range than the first map display screen.

Therefore, in the portable terminal 1, it is possible to display a map display transition to the user in a natural manner via an animation.

The display control unit 55 causes to be displayed a map display screen transition process of transitioning from the second map display screen to the first map display screen in a manner incorporating an animation of transitioning to the first map display screen by zooming in from a position overlooking the prescribed location on the second map display screen.

Therefore, in the portable terminal 1, it is possible to display a map display transition to the user in a natural manner via an animation.

The portable terminal 1 further includes a schedule information obtaining process 53A.

The schedule information obtaining process 53A obtains schedule-related information.

The display control unit 55 controls the output unit 20 so as to display a map image corresponding to positional information of a destination of the schedule-related information obtained by the schedule information obtaining process 53A, and so as to display the obtained clock hand image superimposed onto at least a portion of the map image in such a rotated manner as to indicate a time.

This makes it possible to display map images of areas surrounding the destinations specified in the user's schedules prior to those schedules.

This, in turn, makes it possible to provide information about the next destination to the user in advance.

The positional information obtaining process 52 obtains information related to a movement range of a user.

The display control unit 55, in accordance with a setting by the user, switches between a process of controlling the output unit 20 so as to display an image corresponding to the movement range and the positional information obtained by the positional information obtaining process 52 and a process of controlling the output unit 20 so as to display the map image corresponding to the positional information of the destination of the schedule-related information obtained by the schedule information obtaining process 53A. This allows the user to, in accordance with the intended use case, select and display map images of areas surrounding the current location and having map ranges based on movement distance from the past to the present and map images of areas surrounding schedule destinations.

The portable terminal 1 further includes a map update condition determination process 53B.

The map update condition determination process 53B determines, on the basis of the current location, a current time, the destination of the schedule-related information, and a date and time of the schedule-related information, whether to update the map image displayed on the output unit 20.

The display control unit 55 updates the map image on the basis of the determination result from the map update condition determination process 53B.

This makes it possible to update the map image appropriately in accordance with schedules.

The map update condition determination process 53B determines to update the map image when the schedule information obtaining process 53A detects schedule-related information that is closest to the current time from among schedule-related information for which a start date and time is within a first threshold period from the current time and a destination is separated from the current location by at least a first threshold distance in terms of linear distance.

As a result, a map image for a schedule set for a prescribed upcoming period from the current time and a destination separated from the current location by a prescribed distance is displayed, which makes it possible to select and display the destination of the schedule appropriate for the user.

The map update condition determination process 53B, after determining to update the map image, blocks updates of the map image once the current time is within a second threshold period prior to a start of a schedule, even if another schedule satisfying a condition for updating the map image is newly detected.

Therefore, when schedules are configured in a consecutive manner, it is possible to prevent situations in which each time the current destination is approached, the display is updated to the map image for the next destination and the map image for the current destination is no longer available for reference.

The map update condition determination process 53B stops blocking map image updates once the current location is within a second threshold distance from the destination of the schedule-related information in terms of linear distance or once the current time is within a third threshold period from an end time of the schedule-related information.

This makes it possible to prevent map image updates from continuing to be blocked.

The present invention is not limited to the embodiment described above, and various modifications, improvements, or the like within the scope of making it possible to achieve the objectives of the present invention are included in the present invention.

The embodiment described above is configured so as to display, for the scale (map scale) for setting the range of the map image, a range corresponding to the total movement distance (movement distance along a movement path). However, the present invention is not limited to this example. The linear distance between the movement start point and end point may be used, or the travel distance may be used. Moreover, the map may be set to a frequently visited range from a movement history, may be set to a frequently visited range including the current location, may be set to a range corresponding to past movement history, or may be set a range of movement from a history of movement at the same time as the current time on past days. For example, if there is history of moving from location A to location B every Wednesday at 9 AM, when the current time becomes 9 AM on Wednesday, the map display would be set to a range from location A to location B.

Furthermore, the map scale may be determined from movement distance during a prescribed period starting from a prescribed start time, for example. In this case, the map scale may be set to a range corresponding to the linear distance to a location for which the linear distance thereto from a movement start point on the previous day was the greatest among those observed within a one-day period.

Moreover, the threshold values for distances and the threshold values for times in the embodiments described above can be set in various different ways in accordance with the purpose of these settings. For example, the first threshold distance, the second threshold distance, and the third threshold distance in Embodiment 2 can be set in terms of travel distance instead of being set in terms of linear distance.

Moreover, the zoom animation process is not limited to that of the embodiment described above, and does not need to be performed every time a map image is displayed. Instead, a map image may be displayed without performing the zoom animation process when various conditions are satisfied (such as when the animation has already been displayed a prescribed number of times or for a prescribed period of time, or when an animation stop operation by the user is detected).

Furthermore, although in the embodiment described above the range of the map that is obtained and set and the range of the map that is displayed are both set to the same range, the present invention is not limited to this example. The range of the map that is displayed may be set to be smaller than the range of the map that is obtained and set. Alternatively, in the range of the map that is obtained and set, when the range is expanded to make the map easier to understand by including geographic features such as oceans and mountains or landmarks or the like, a map of a wider range than the range of the map that is obtained and set may be displayed, for example. In addition, the retrieval range and display range for the map image may be set automatically based on prescribed conditions or may be set manually based on manual user operations.

Moreover, in the embodiment described above, the map display may be configured such that the display range and the map display scale can be changed at a later point. For example, in the map display, after initially displaying a map image, the display range may be changed by moving the display position, changing the scale, changing the orientation, or the like in accordance with user operations such as slide, zoom, or rotation operations.

Furthermore, in the embodiment described above, the map display can be displayed in various projection styles, such as a Mollweide projection, a Mercator projection, or an azimuthal equidistant projection, for example. Also, in consideration of the size of the display region, the map display can be displayed in a simplified or stylized manner rather than being displayed in detail. In addition, the map images used do not need to be detailed displays, and images of small data size can be used as long as the amount of information is at least sufficient for the user to be able to read the map. Using map images of small data size prevents the amount of information presented to the user from being too excessive and also makes it possible to render the images smoothly.

Moreover, although the embodiment described above is configured to display the current time, the present invention may be configured to display a specific time, a user-specified hypothetical time, a time shifted (forward or backward) from the current time by a prescribed amount of time, or the like, for example. Furthermore, although the embodiment described above is configured to display a realistic map image corresponding to the actual current location or the like, the present invention may be configured to display map information for a range corresponding to hypothetical positional information on a hypothetical map, for example.

Moreover, in the embodiment described above, the portable terminal 1 may perform only the display process, and the processes of creating the display images and the like may be performed by an external device (a server, a smartphone that acts as a parent device, or the like).

Furthermore, although in the embodiment above the portable terminal 1 to which the present invention is applied was described as being a smartwatch as an example, the present invention is not particularly limited to this example.

For example, the present invention can be applied to general electronic devices that have an analog clock and map display process feature. More specifically, the present invention can be applied to notebook personal computers, printers, television sets, video cameras, digital cameras, portable navigation devices, mobile phones, smartphones, portable game systems, and the like, for example.

The sequence of processes described above can be implemented with hardware or can be implemented with software.

In other words, the functional configuration illustrated in FIG. 4 is only an example and is not particularly limited. The portable terminal 1 may have any features as long as those features make it possible to perform the sequence of processes described above overall, and the types of functional blocks used to implement these features are not particularly limited to the example illustrated in FIG. 4.

Moreover, each functional block may be configured as a hardware unit, may be configured as a software unit, or may be configured as a combination of both.

The functional configuration of the present embodiment is implemented with a processor that executes processes. Examples of processors that can be used in the present embodiment include processors configured using various types of processing devices such as single processors, multiprocessors, and multi-core processors, as well as configurations in which these various types of processing devices are integrated together with processing circuits such as application-specific integrated circuits (ASICs) or field-programmable gate arrays (FPGAs).

When the sequence of processes is implemented using software, the programs constituting that software are installed on a computer (processor) or the like from a network or storage medium.

The computer (processor) may be a computer embedded in dedicated hardware. Moreover, the computer may be a computer that can perform various types of functions by installing various types of programs, such as a general-purpose personal computer.

The storage medium storing these programs includes not only the removable medium 31 illustrated in FIG. 1 that is distributed separately from the main device to provide the programs to users, but also a storage medium that is provided to users already embedded in the main device in advance, or the like. The removable medium 31 is a magnetic disk (including a floppy disk), an optical disc, a magneto-optical disc, or the like, for example. The optical disc is a Compact Disc Read-Only Memory (CD-ROM), Digital Versatile Disc (DVD), Blu-ray Disc (registered trademark), or the like, for example. The magneto-optical disc is a MiniDisc (MD) or the like. Moreover, the storage medium that is provided to users already embedded in the main device in advance includes the ROM 12 illustrated in FIG. 1 that stores programs, a hard disk included in the storage unit 21 illustrated in FIG. 1, or the like, for example.

Furthermore, in the present specification, steps coded in the programs stored on the storage medium include not only processes performed in chronological order in accordance with the order of those steps, but also processes that may not necessarily be performed in chronological order but are performed separately or in parallel.

Although several embodiments of the present invention were described above, these embodiments are only examples and do not limit the technical scope of the present invention in any way. The present invention can take the form of various other embodiments, and various modifications such as removal or replacement of components can be made without departing from the spirit of the present invention. These embodiments and modifications thereof are included within the scope and spirit of the invention as described in the present specification and the like and are also included within the scope of the invention as defined in the claims, their equivalents, and the like.

What is claimed is:

1. An electronic device, comprising:
   one or more processors; and
   a display unit controlled by said one or more processors,
   wherein said one or more processors perform:
      obtaining a clock hand image;
      obtaining positional information indicating a location of the electronic device; and
      controlling the display unit to display a map image that includes said location of the electronic device and to display the clock hand image superimposed onto the map image in such a rotated manner as to indicate a time, a center of rotation of the clock hand image being set at said location of the electronic device in the map image.

2. The electronic device according to claim 1,
   wherein said positional information indicates a current location of the electronic device at a current time as said location indicated by the positional information,
   wherein said one or more processors further identify a movement range that includes the current location of the electronic device indicated by the positional information obtained at the current time and a previous location of the electronic device at a prescribed time in the past, and
   wherein said map image includes said identified movement range.

3. The electronic device according to claim 1,
   wherein said positional information indicates a current location of the electronic device at a current time,
   wherein said map image is a map image corresponding to the current location indicated by the positional information obtained at the current time.

4. The electronic device according to claim 3, wherein during map display, said one or more processors cause the display unit to display, in a manner incorporating an animation, a map display screen switching process of switching between two map display screens of a first map display screen that displays a map image corresponding to the current location of the electronic device and a second map display screen that displays a map image of a wider range than the first map display screen.

5. The electronic device according to claim 4, wherein the map display screen switching process displayed on the display unit is a switching process by an animation from the second map display screen to the first map display screen by zooming in to the image corresponding to the current location from the second map display screen.

6. The electronic device according to claim 5, wherein said one or more processors, in accordance with an extent of a range of the second map display screen, change a zoom speed of the animation of switching to the first map display screen by zooming in from the second map display screen.

7. The electronic device according to claim 1, wherein said one or more processors control the display unit so as to display the map image such that the location of the electronic device indicated by the positional information is at a center of a display region on the display unit.

8. The electronic device according to claim 1, wherein said one or more processors control the display unit so as to display the clock hand image such that a center of a display region on the display unit is at the center of rotation of the clock hand image.

9. The electronic device according to claim 1, wherein said one or more processors cause a guide line indicating a prescribed direction relative to the center of rotation of the clock hand image to be displayed on the display unit.

10. The electronic device according to claim 1,
wherein said one or more processors obtain information related to a movement range of a user, and
wherein said one or more processors control the display unit so as to display an image corresponding to the movement range obtained by said one or more processors and an image corresponding to a current location or a previous location of the electronic device.

11. The electronic device according to claim 1,
wherein in the step of obtaining said positional information indicating the location of the electronic device, said one or more processors perform a schedule information obtaining process that obtains scheduled move information that includes a move to a destination, as said positional information, and set a future location of the electronic device corresponding to the destination as said location of the electronic device indicated by the positional information, and
wherein said map image displayed by the display unit is a destination map image corresponding to the destination indicted by the scheduled move information obtained by the schedule information obtaining process.

12. The electronic device according to claim 11, wherein said one or more processors further determine, on the basis of a current location, a current time, the destination indicated by the scheduled move information, and a date and time indicated by the scheduled move information, whether to update the destination map image displayed on the display unit,
wherein said one or more processors cause the display unit to display an updated destination map image when said one or more processors determine to update the destination map image.

13. The electronic device according to claim 12,
wherein said one or more processors determine to update the destination map image when said one or more processors detect new scheduled move information that includes a new destination and that is to occur closest in time to the current time from among scheduled moves that satisfy prescribed conditions, said prescribed conditions being that a start date and time is within a first threshold period from the current time and a destination is separated from the current location by at least a first threshold distance.

14. The electronic device according to claim 13,
wherein said one or more processors, after determining to update the destination map image, do not perform further updates of the destination map image once the current time is within a second threshold period prior to a start of a scheduled move with respect to which the ;ast update of the destination map image is performed, even if another scheduled move satisfying said prescribed conditions for updating the destination map image is newly detected.

15. The electronic device according to claim 14,
wherein said one or more processors resume updates of the destination map image once the current location is within a second threshold distance from the destination of the scheduled move with respect to which the last update of the destination map image is performed or once the current time is within a third threshold period from an end time of the scheduled move with respect to which the last update of the destination map image is performed.

16. The electronic device according to claim 1,
wherein said positional information indicates a current location of the electronic device at a current time as said location indicated by the positional information,
wherein said one or more processors further identify a movement range that includes the current location of the electronic device indicated by the positional information obtained at the current time and a previous location of the electronic device at a prescribed time in the past,
wherein said map image includes said identified movement range,
wherein said one or more processors further perform a schedule information obtaining process that obtains scheduled move information that includes a move to a destination,
wherein said one or more processors further cause the display unit to display a destination map image corresponding to the destination indicted by the scheduled move information obtained by the schedule information obtaining process, and to display the clock hand image superimposed onto the destination map image in such a rotated manner as to indicate a time, a center of rotation of the clock hand image being set at a location of the destination in the destination map image.

17. A method performed by one or more processors in an electronic device having a display unit controlled by said one or more processors, the method comprising:
obtaining a clock hand image;
obtaining positional information indicating a location of the electronic device; and
controlling the display unit to display a map image that includes said location of the electronic device and to display the clock hand image superimposed onto the map image in such a rotated manner as to indicate a time, a center of rotation of the clock hand image being set at said location of the electronic device in the map image.

18. The method according to claim 17, wherein the location of the electronic device is a future location of the electronic device at a future time indicated by a schedule, or a current location of the electronic device at a current time.

19. A computer-readable non-transitory storage medium having stored therein a program that causes one or more processors in an electronic device having a display unit controlled by said one or more processors to perform:
obtaining a clock hand image;
obtaining positional information indicating a location of the electronic device; and
controlling the display unit to display a map image that includes said location of the electronic device and to display the clock hand image superimposed onto the map image in such a rotated manner as to indicate a time, a center of rotation of the clock hand image being set at said location of the electronic device in the map image.

20. The computer-readable non-transitory storage medium according to claim 19, wherein said location of the electronic device is a future location of the electronic device at a future time indicated by a schedule, or a current location of the electronic device at a current time.

* * * * *

UNITED STATES PATENT AND TRADEMARK OFFICE
CERTIFICATE OF CORRECTION

| | |
|---|---|
| PATENT NO. | : 10,691,075 B2 |
| APPLICATION NO. | : 15/856071 |
| DATED | : June 23, 2020 |
| INVENTOR(S) | : Keiichi Imamura, Kousuke Ishizaki and Takeshi Okada |

It is certified that error appears in the above-identified patent and that said Letters Patent is hereby corrected as shown below:

On the Title Page

At item (12), delete "Imamura" and insert -- Imamura et al. --

At item (72) Inventor, the following inventors should be add:
-- Kousuke ISHIZAKI, Tokyo (JP)
Takeshi OKADA, Tokyo (JP) --

Signed and Sealed this
Twenty-fourth Day of October, 2023

Katherine Kelly Vidal
*Director of the United States Patent and Trademark Office*